United States Patent [19]

Hashimoto et al.

[11] 4,244,843

[45] Jan. 13, 1981

[54] COVULCANIZED RUBBER

[75] Inventors: Kenjiro Hashimoto; Shinichi Takagi, both of Kobe; Harunori Okamoto, Sakai; Minoru Miura, Nishinomiya, all of Japan

[73] Assignee: Mitsubishi Belting, Ltd., Kobe, Japan

[21] Appl. No.: 68,364

[22] Filed: Aug. 21, 1979

Related U.S. Application Data

[60] Division of Ser. No. 764,143, Jan. 31, 1977, which is a continuation of Ser. No. 444,218, Feb. 20, 1974, abandoned.

[30] Foreign Application Priority Data

Apr. 28, 1973 [JP] Japan .................................. 48-48789
Apr. 28, 1973 [JP] Japan .................................. 48-48790

[51] Int. Cl.$^3$ .......................... C08L 7/00; C08L 9/02; C08L 9/06; C08L 9/00
[52] U.S. Cl. ...................... 260/5; 525/194; 525/195; 525/196; 525/211; 525/215; 525/236; 525/237
[58] Field of Search ............... 525/194, 195, 196, 211, 525/215, 236, 237; 260/5

[56] References Cited

U.S. PATENT DOCUMENTS

| | | | |
|---|---|---|---|
| 2,234,215 | 3/1941 | Youker et al. .......................... | 260/89 |
| 2,945,834 | 7/1960 | Coulter et al. .................. | 260/79.5 B |
| 3,057,832 | 10/1962 | Brock .............. | 260/79.5 B |
| 3,061,594 | 10/1962 | Kockro .......................... | 260/79.5 B |
| 3,078,258 | 2/1963 | Harman .......................... | 260/79.5 B |
| 3,093,621 | 6/1963 | Gladding .......................... | 260/79.5 B |
| 3,546,185 | 12/1970 | Coran et al. ...................... | 260/79.5 B |
| 3,644,304 | 2/1972 | Behrens ................................. | 526/35 |
| 3,678,017 | 7/1972 | Shelton et al. .................. | 260/79.5 B |
| 3,821,134 | 6/1974 | Son et al. ............................. | 526/35 |
| 3,844,970 | 10/1974 | Kempermann et al. ................ | 526/35 |
| 3,943,143 | 3/1976 | Popoff et al. .......................... | 526/35 |

OTHER PUBLICATIONS

Kirk-Othmer, "Encyclopedia of Chemical Technology" Second Ed., vol. 17, 1968, p. 548.

*Primary Examiner*—Wilbert J. Briggs, Sr.
*Assistant Examiner*—Arthur H. Koeckert
*Attorney, Agent, or Firm*—Sughrue, Rothwell, Mion, Zinn and Macpeak

[57] ABSTRACT

A rubber composition and a process for the preparation of rubber compositions comprising, in the presence of a metal oxide, vulcanizing, or vulcanizing after blending with another unsaturated rubber, of the reaction product of (1) an unsaturated rubber, sulfur and a sulfur cleaving agent, (2) an unsaturated rubber and a mercaptan compound, (3) a halogenated unsaturated rubber and a metal salt of a sulfur cleaving agent, or (4) an unsaturated rubber, a sulfur cleaving agent and a compound having a functional group such as a nitrile oxide, a nitroso or a thionylamine.

6 Claims, No Drawings

COVULCANIZED RUBBER

This is a division of application Ser. No. 764,143 filed Jan. 31, 1977, and in turn a continuation of Ser. No. 444,218, filed Feb. 20, 1974, now abandoned.

BACKGROUND OF THE INVENTION

1. Field of the Invention

The present invention relates to rubber compositions. More particularly, the present invention relates to improvements in the rate of cure and the properties of vulcanized products such as tensile strength when sulfur vulcanization of known elastomers containing unsaturated double bonds is carried out, and to rubber compositions having excellent co-vulcanization ability when blended with other rubbers.

2. Description of the Prior Art

In general, sulfur vulcanization has been widely practised in the rubber industry. Commonly, vulcanization has been carried out by mixing an unsaturated elastomer together with sulfur, a metal oxide such as ZnO, CdO, MgO, PbO, CaO or NiO, etc., fatty acids, vulcanization accelerators and another additives for rubber compositions, and pressing with heating. Vulcanization of this type is believed to proceed as follows.

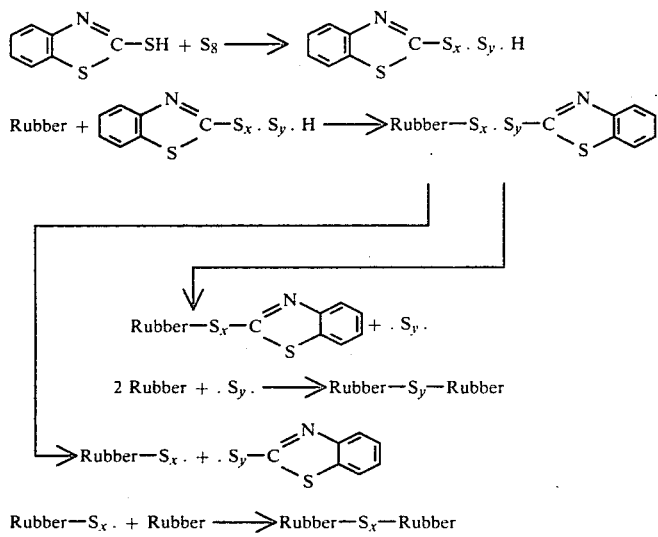

The above described reactions are one model of vulcanization. Practically, these reactions are accompanied by other very complicated reactions. Thus, it has been believed that such reactions form heterogeneous cross-linking points. Accordingly, the properties of the rubber can be further improved in a vulcanization of such a type, if a more homogeneous vulcanization is carried out. It is also known that low unsaturated rubbers such as EPDM and IIR have a good weather-proofing property and particularly good ozone cracking resistance, because such rubbers have a small number of double bonds in the structure. However, these rubbers have essential defects in that they have poor tackiness and thus the molding or processing involved in producing products which require complicated workings such as tires and belts, etc., are difficult to carry out and also sulfur vulcanization which has a rapid rate of cure is difficult to carry out because of the presence of a small amount of unsaturated bonds. At the present time, even though many studies have been made to improve these defects, satisfactory results have not been obtained.

On the other hand, high unsaturated rubbers such as NR and SBR have essential defects in that they have a poor heat resistance and a poor weather-proofing property because of a large number of double bonds (unsaturated groups) in the structure.

For the purpose of improving the weather-proofing property of these highly unsaturated rubbers, production of blends of these rubbers and the above described low unsaturated rubbers has been attempted. However, although blends having a certain mixing ratio wherein one of the two rubbers is present in a small amount can be practically used, a practical blend of both rubbers at a suitable ratio has not been achieved, because they form a heterogeneous phase resulting in a deterioration of properties, since both rubbers have essentially different properties. The reasons are that there is no interaction between the two rubbers because they are incompatible with each other and that it is difficult to carry out homogeneous vulcanization of the blend because each rubber has a different rate of cure on sulfur vulcanization. Accordingly, many studies have been made in order to obtain good co-vulcanized products by blending these rubbers.

Namely, the following approaches have been suggested:

(1) to increase the amount of sulfur added,
(2) to vulcanize using peroxides,
(3) to increase the amount of the third component (ethylidenenorbornene) so as to increase the rate of cure of EPDM itself,
(4) to modify EPDM with halogens, and
(5) to blend a slightly pre-vulcanized EPDM so that the cure rates of the rubbers more close by approach each other.

However, these methods are not practical. A good result can be obtained only where EPDM is modified by bromine. However, this case is suitable only for a special use, because the brominating agent as the modifier is expensive, the bromine is dangerous to humans, and storage ability is inferior because the vulcanization of the brominated EPDM itself proceeds at room temperature by metal oxides or amines after mixing. Consequently, it is not actually used as an available rubber.

SUMMARY OF THE INVENTION

As the result of studies to solve the above described defects, the present inventors have accomplished the present invention. Namely, the present inventors have found that the properties of the vulcanized blend are improved if the vulcanization is carried out by the method of this invention which comprises, in the presence of a metal oxide such as ZnO, CdO, MgO, PbO, CaO or NiO, etc., vulcanizing, or vulcanizing after blending with another rubber, of a pendant rubber comprising the reaction product of (1) an unsaturated rubber with sulfur and a sulfur cleaving agent;
(2) an unsaturated rubber with a mercaptan compound;
(3) a previously halogenated unsaturated rubber and a metal salt of the sulfur cleaving agent; or
(4) an unsaturated rubber, a sulfur cleaving agent and a compound having a functional group such as a nitrile oxide, a nitroso or a thionylamine.

instead of the prior method which comprises vulcanizing by mixing unsaturated rubbers together with sulfur, a vulcanization accelerator and activators, and thus the present invention has been accomplished.

DETAILED DESCRIPTION OF THE INVENTION

The essential technical idea of the present invention, which is not to carry out cross-linking in one step by adding many kinds of vulcanizing agents to rubbers and heating, is based on a method which comprises combining with the rubber, fragments of the sulfur cleaving agent or in the form of mono-, di- and polysulfide and heating the rubber in the presence of a metal oxide such as ZnO, CdO, MgO, PbO, CaO or NiO, etc. to cleave the polysulfide, whereby sulfur bi-radicals are released and the polysulfide is converted into monosulfide and disulfide thereby causing cross-linking of the rubber molecules.

In the prior sulfur vulcanization method which comprises mixing the rubbers together with sulfur, vulcanization accelerators and activators using a roll mill and cross-linking by heating, it is necessary that both the sulfur and the vulcanization accelerator be present near the double bonds in the rubber molecules because the sulfur and the vulcanization accelerator are related to cross-linking. Therefore, a homogeneous dispersion thereof is remarkably desired. Further, in rubber blends such as EPDM and NR which have poor compatibility with each other, it is believed that the sulfur and the vulcanization accelerator easily diffuse to the NR rubber during vulcanization to form localized cross-linking and thus the properties of the co-vulcanized rubbers deteriorate. On the contrary, according to the present invention, the prior defects are improved and homogeneous cross-linking can be carried out, because the fragments of the sulfur cleaving agent chemically combine with the rubber molecule through mono-, di- or polysulfide. Furthermore, in the case of the blends, since sulfur compounds are previously combined with the rubbers, these fragments can not freely diffuse during vulcanization, and consequently uniform cross-linkages are formed therein and co-vulcanized rubbers having good properties can be obtained. Accordingly, the objects of the present invention which are achieved are (1) to improve the properties of the vulcanized unsaturated rubbers in sulfur vulcanization and to provide rubber blend compositions having an increased rate of cure in sulfur vulcanization,
(2) to provide a method of improving the rate of cure of the unsaturated rubbers and particularly low unsaturated rubbers, such as EPDM, in sulfur vulcanization,
(3) to provide rubber blend compositions having good co-vulcanization properties, wherein low unsaturated rubbers such as EPDM or IIR and high unsaturated rubbers such as SBR or NR can be blended in a suitable ratio in sulfur vulcanization, and
(4) to provide a method of combining the sulfur cleaving agent with unsaturated rubbers.

The unsaturated rubbers which can be used in the present invention are rubbers having double bonds in the molecule thereof.

Examples of such rubbers include natural rubbers (designated as NR), polyisoprene rubbers (designated as IR), polybutadiene rubbers (designated as BR), styrene-butadiene copolymers (designated as SBR), nitrile rubbers (designated as NBR) and polychloroprene rubbers (designated as CR) which have relatively high unsaturation and ethylenepropylene terpolymers (designated as EPDM) and butyl rubbers (designated as IIR) which have relatively low unsaturation.

The sulfur cleaving agents which can be used in the present invention include tertiary amines ($R_3N$) such as trimethylamine and triethylamine, secondary amines ($R_2NH$) such as dimethylamine, aliphatic primary amines, aromatic primary amines, aliphatic polyamines, cyclic amines such as morpholine and hexamethylenetetramine, thiazole type accelerators such as mercaptobenzothiazole, dibenzothiazyl disulfide, N-cyclohexyl-2-benzothiazyl sulfenamide, N-oxydiethylene-2-benzothiazyl sulfenamide and N,N-dicyclohexyl-2-benzothiazyl sulfenamide, guanidine type accelerators such as diphenylguanidine and di-o-tolylguanidine, thiourea type accelerators such as diethylthiourea and thiocarbamide, thiuram type accelerators such as tetramethylthiuram disulfide and tetramethylthiuram monosulfide, dithiocarbamic acid type accelerators such as zinc dimethyl-dithiocarbamate and iron dimethyl-dithiocarbamate, xanthogenates such as zinc butylxanthogenate, zinc thiophosphate type accelerators, mixtures of these accelerators, phosphorus compounds of the formula $R_3P$ such as triphenylphosphine and tributyl phosphine, $P(OR)_3$ such as triethyl phosphite and $PNa(OR)_2$ such as sodium diethyl phosphate and sodium dibutyl phosphate, nucleophilic reagents containing a CN group such as $NCSCH_2CO_3CH_3$ and $C_6H_5SCN$, Lewis acids ($AlCl_3$, $ZnCl_2$), and acids such as sulfuric acid, p-toluenesulfonic acid and mixtures thereof. These cleaving agents to be combined with the unsaturated rubbers are satisfactorily used if they are added in such an amount that they serve for ring closure of the sulfur molecules so as to become linear in the rubbers. Accordingly, the objects of the present invention can be sufficiently attained if they are added in an amount equal to or less than the amount of the sulfur cleaving agents generally used in conventional rubber compositions.

Generally, the sulfur cleaving agent can be used in a proportion of from 0.1 to 10%, preferably 0.3 to 1.5% by weight based on 100% by weight of the rubber.

In the first step of the present invention, the above described sulfur cleaving agents are combined with the unsaturated rubbers. In this step, a metal oxide such as ZnO, MgO, PbO, CaO, CdO or NiO which accelerates the vulcanization is not present. Other additives, however, for the rubber compositions can be previously added to the unsaturated rubbers, if desired.

Suitable methods of combining the sulfur cleaving agent with the unsaturated rubbers are as follows.

(1) The sulfur and the sulfur cleaving agent are added to the unsaturated rubber and the mixture is mixed at less than 60° C. using a roll mill. Then the mixed rubber is heated, e.g., by being exposed to hot air, a nitrogen stream or stream at above 60° C. and preferably above 100° C., or by being placed on a heating plate to carry out the heat treatment at above 60° C. The time required for producing a pendant rubber but insufficient to vulcanize unsaturated rubber varies depending mainly upon the amount and type of the sulfur cleaving agent and the temperature employed, but is generally from 1 to 180 minutes.

(2) The sulfur and the sulfur cleaving agent are added to the unsaturated rubber and the mixture is mixed at above 60° C. and preferably above 100° C.

(3) A mercaptan compound is added to the unsaturated rubber (in an organic solvent) to cause an addition reaction. The term "mercaptan compound" used herein refers to mercaptan-containing compounds and suitable examples of the mercaptan compound are 2-mercaptobenzothiazole, N-phenylmercapto-2-benzothiazole, p-mercaptoaniline, the diphenylguanidine salt of p-mercaptobenzoic acid, the trimethylthiourea salt of p-mercaptobenzoic acid and the like.

(4) The unsaturated rubber is halogenated and then the halogenated rubber is subjected to a substitution reaction with a metal salt of a sulfur cleaving agent. Suitable examples of the metal salt of the sulfur cleaving agent of 2-mercaptobenzothiazole are the sodium salt of 2-mercaptobenzothiazole, the potassium salt of 2-mercaptobenzothiazole and the silver salt of 2-mercaptobenzothiazole, preferably, the silver salt of 2-mercaptobenzothiazole.

(5) The compound which is produced by combining a compound having a functional group such as a nitrile oxide, a nitroso or a thionylamine, etc. when the sulfur cleaving agent is combined with the unsaturated rubber.

Examples of the compounds to be combined include p-aminothionylamine, the 2-mercaptobenzothiazole salt of p-aminothionylamine, 2-mercapto-4-thionylaniline sulfenamide, 4-thionylaniline-2-mercaptobenzothiazole, the diphenylguanidine salt of p-carboxythionylaniline, the hexamethylenetetramine salt of p-carboxythionylaniline, the alkylthiourea salts of p-carboxythionylaniline, p-nitrosoaniline, the mercaptobenzothiazole salt of p-nitrosoaniline, nitrosodiethylamine, nitrosodimethylamine, N-dimethylnitrosoaniline, N-nitrosodiphenylamine, 2-mercapto-p-nitrosoaniline sulfenamide, 4-nitrosophenyl-2-mercaptobenzothiazole, the diphenylguanidine salt of p-nitrile oxide benzoic acid, the hexamethylenetetramine salt of p-nitrile oxide benzoic acid and the alkylthiourea salts of p-nitrile oxide benzoic acid.

The reactions in the above described methods (1), (3), (4) and (5) are carried out by adding the above described compounds to a solid rubber or by dissolving the rubber in a solvent and adding the above described compounds thereto with stirring, and preferably heating to combine. In the present invention, when two kinds of rubber, particularly a low unsaturated rubber and a high unsaturated rubber, are used, preferably the sulfur cleaving agent is previously combined with the low unsaturated rubber component. Further, other rubbers to be blended include the same kind of rubber but the sulfur cleaving agent is not combined.

In the following, the present invention will be illustrated in greater detail by reference to the following examples. (All formulations in the Examples are expressed by PHR (parts per hundred rubber).)

EXAMPLE 1

After mixing samples having the composition shown in Table 1 at 40° to 50° C. using rolls, the samples were heated to 150° C. for 0 to 100 minutes. Using these samples, the cross-linking density, the quantity of combined sulfur and the quantity of combined sulfur cleaving agent were measured.

TABLE 1

| | Sample No. | |
|---|---|---|
| | 1 | 2 |
| EPDM (third component: ethylidene norbornene, iodine number: 26) | 100 | 100 |
| Sulfur Cleaving Agent (Accelerator CZ) (N-cyclohexyl-2-benzothiazyl sulfenamide) | 1.0 | 1.0 |
| Sulfur | 2.0 | 2.0 |
| Zinc Oxide | — | 5 |
| Stearic Acid | — | 1 |

The appended FIGS. 1, 2 and 3 show the results of the above described measurements, wherein (a) refers to Sample 1 (the present invention) and (b) refers to Sample 2 (the known method). The measurements of the cross-linking density, the quantity of combined sulfur and the quantity of combined sulfur cleaving agent were carried out by the following methods.

Cross-linking Density:

The sample (10×20×2 mm) was swollen in toluene at 20° C. for 48 hours. After measuring the degree of swelling, the cross-linking density was calculated using an interaction coefficient to the solvent of 0.45.

Quantity of Combined Sulfur:

About 0.5 g of the sample was weighed out. After extraction i a Soxhlet extractor using acetone for 12 hours, the acetone was removed by distillation. Then 50 ml of ethanol and 0.1 g of KCN were added thereto and the mixture was refluxed on a water bath. Then the quantity of free sulfur was measured by carrying out potentiometric titration using a silver electrode in N/100 AgNO$_3$. The quantity of the combined sulfur was calculated by subtracting the quantity of free sulfur from the quantity of sulfur added. In Sample 2, the quantity of sulfur of the sulfide was also subtracted.

Quantity of Combined Sulfur Cleaving Agent:

About 1 g of the sample was weighed out. After extraction in a Soxhlet extractor using methanol for 24 hours, the extracted material was dried in a vacuum. Then the quantity of nitrogen thereof was measured by elementary analysis. The quantity of the combined nitrogen was calculated by subtracting the measured quantity of nitrogen from the quantity of nitrogen in the sulfur cleaving agent added. The quantity of the combined sulfur cleaving agent was calculated from the quantity of combined nitrogen determined. The results obtained are shown in FIG. 3. It can be understood from the results of the measurements of the quantity of combined sulfur, the quantity of combined sulfur cleaving agent and the cross-linking density that the sulfur and the sulfur cleaving agent sufficiently combine with the polymers and cross-linkage is barely caused, although the composition which does not contain ZnO is used. Thus, it is believed that the polymers represented by the following formulae, which are the object of this invention, have been formed.

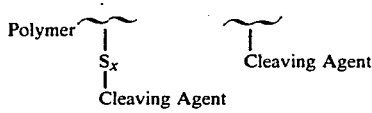

EXAMPLE 2

100 Parts of EPDM (third component: ethylidene norbornene, iodine number: 23), 1.2 parts of Accelerator H as a sulfur cleaving agent (hexamethylenetetramine) and 1.0 part of sulfur were homogeneously mixed at about 50° C. using rolls to produce a sheet having a thickness of about 2.5 mm. This sheet was allowed to stand in steam at 150° C. for 90 minutes to combine the sulfur cleaving agent with the low unsaturated rubber.

Samples were produced using the resulting rubber (pendant EDPM) wherein the sulfur cleaving agent had been combined. More specifically, the following Composition A was mixed using rolls at 50° C. and vulcanized at 150° C. for the period of time shown in Table 1 to produce samples.

| Composition A: | |
|---|---|
| Pendant EPDM | 100 |
| Zno | 5 |
| Stearic Acid | 1 |
| Accelerator DM (dibenzothiazyl disulfide) | 1.5 |
| Sulfur | 1.0 |

For the purpose of comparison, samples were produced using the following Composition B.

| Composition B: | |
|---|---|
| EPDM | 100 |
| ZnO | 5 |
| Stearic Acid | 1 |
| Accelerator DM | 1.5 |
| Accelerator H | 1.2 |
| Sulfur | 2.0 |

The comparison samples were produced by mixing and vulcanizing the above described Composition B under the same conditions as in the case of using Composition A. The properties of these samples produced from Composition A and Composition B were measured according to JIS K-6301. The results obtained are shown in Table 2.

TABLE 2

| | Composition | | | | | |
|---|---|---|---|---|---|---|
| | Composition A (this invention) | | | Composition B (Comparison) | | |
| Properties | 300% Modulus (kg/cm$^2$) | Tensile Strength (kg/cm$^2$) | Elongation at Break (%) | 300% Modulus (kg/cm$^2$) | Tensile Strength (kg/cm$^2$) | Elongation at Break (%) |
| Vulcanization Time | | | | | | |
| 40 Minutes | 25.4 | 39.4 | 364 | 14.1 | 18.5 | 382 |
| 60 Minutes | 28.9 | 34.1 | 327 | 16.3 | 16.4 | 202 |

It can be understood from the results in the above table that the properties of the rubber after vulcanization of the EPDM wherein the sulfur cleaving agent is combined according to the present invention are remarkably excellent as compared with those of the EPDM wherein the sulfur cleaving agent is not combined.

EXAMPLE 3

100 Parts of an EPDM rubber (third component: ethylidene norbornene, iodine number: 23), 1.5 parts of Accelerator CZ as a sulfur cleaving agent (N-cyclohexyl-2-benzothiazyl sulfenamide) and 1.0 part of sulfur were mixed at about 50° C. using rolls. The homogeneously dispersed mixture was then put between press plates and pressed at 150° C. under 8 kg/cm$^2$ of pressure for 0, 10, 20, 30, 40 or 80 minutes to produce a pendant EPDM.

Then sheets were produced using the resulted pendant EPDM. More specifically, the following Composition C was mixed homogeneously using rolls at about 50° C. A vulcanization diagram was determined using an oscillating disk rheo-meter (temperature: 153° C.). The results obtained are shown in FIG. 4.

| Composition C: | |
|---|---|
| Pendant EPDM | 100 |
| Zno | 5 |
| Stearic Acid | 1 |
| Sulfur | 1.5 |

The sample wherein the heating time was 0 minute is a sample produced by mixing 100 parts of EPDM, 1.5 parts of Accelerator CZ, 5 parts of ZnO, 1 part of stearic acid and 2.5 parts of sulfur at about 50° C. by rolls.

The curves a, b, c, d, e and f in the vulcanization diagram of FIG. 4 are of the samples wherein the heating time of the pendant EPDM is 0, 10, 20, 30, 40 and 80 minutes, respectively and the curve N is of natural rubber. It can be understood from these curves that the sulfur vulcanization of unsaturated rubber proceeds in the samples which were heated for a certain period of time to provide a vulcanization diagram which is not inferior to that of natural rubber.

EXAMPLE 4

100 Parts of IIR (isoprene content: 1.6% by mol), 0.5 parts of Accelerator EZ (zinc diethyldithiocarbamate), 0.5 parts of Accelerator DM and 1.0 part of sulfur were homogeneously mixed using rolls at about 50° C. to produce a sheet. The sheet was then treated at 150° C. for 0, 7.5, 10, 15 or 20 minutes using a press to produce pendant IIR.

Then the following Composition D was homogeneously mixed at about 50° C. to make a sheet and a vulcanization diagram was determined in the same manner as in Example 3 at 158° C. using an oscillating disk rheo-meter. The results obtained are shown in FIG. 5.

| Composition D: | |
|---|---|
| Pendant IIR | 100 |
| ZnO | 5 |
| Stearic Acid | 1.0 |
| Accelerator TT (tetramethyl-thiuram disulfide) | 1.5 |
| Sulfur | 0.5 |

The sample produced from the pendant IIR wherein the heating time was 0 minute was obtained in the same manner as in Example 3.

In FIG. 5, the curves g, h, i, j and k are of the samples wherein the heating time of IIR was 0, 7.5, 10, 15 and 20 minutes, respectively. It can be understood that a more excellent vulcanization diagram is shown as the heating time is increased.

EXAMPLE 5

In the case of a blend of EPDM and NR, the poorest property appears if the blending ratio of EPDM is 70% or so. Thus, this example illustrates that the blends of the present invention have good properties even with such a blending ratio.

| Composition E: | |
|---|---|
| EPDM (third component: ethylidene norbornene, iodine number: 26) | 100 |
| Hexamethylenetetramine as the Sulfur Cleaving Agent (Accelerator H) | 0.4 |
| Sulfur | 1.5 |

The above Composition E was mixed using rolls to produce a sheet (150 mm×200 mm×20 mm). This sheet was treated for 0 to 120 minutes using a heating press at 150° C. under a pressure of 10 kg/cm². Then the following Composition F was mixed and vulcanized at 153° C. for 10 minutes. Then evaluation of the sample was carried out according to JIS-K 6301. The results obtained are shown in Table 3.

| Composition F: | |
|---|---|
| Composition | 100 |
| NR 4 | 30 |
| HEF Carbon | 30 |
| CaCO$_3$ | 20 |
| Stearic Acid | 1 |
| ZnO | 5 |
| Accelerator DM (2-mercaptobenzo-thiazolyl-disulfide) | 1.5 |
| D (diphenylguanidine) | 0.5 |
| Process oil | 10 |
| Sulfur | 1.0 |

In the following table, the treating time is the period of time for the vulcanization press treatment at 150° C.

TABLE 3

| Treating Time (minute) | Vulcanization Time (minute) | 300% Modulus (kg/cm²) | Tensile Strength (kg/cm²) | Elongation (%) |
|---|---|---|---|---|
| 0 | 10 | 2.95 | 43 | 550 |
| 45 | 10 | 32 | 108 | 750 |
| 60 | 10 | 33 | 113 | 725 |
| 90 | 10 | 36 | 122 | 650 |
| 120 | 10 | 31 | 134 | 725 |

EXAMPLE 6

| Composition G: | |
|---|---|
| EPDM (third component: ethylidene norbornene, iodine number: 26) | 100 |
| Hexamethylenetetramine | 0.4 |
| Sulfur | 1.5 |

The above composition was mixed at room temperature and treated using a heating press at 153° C. for 45 minutes or 120 minutes in the same manner as in Example 5 or was not treated (0 minute).

Then, the following Compositions H were prepared by adding NR in the same manner as in Example 5.

| Composition H | (1) | (2) | (3) | (4) | (5) | (6) |
|---|---|---|---|---|---|---|
| Composition G | 80 | 70 | 60 | 40 | 30 | 100 |
| NR 4 | 20 | 30 | 40 | 50 | 70 | — |
| Silica | 30 | 30 | 30 | 30 | 30 | 30 |
| CaCO$_3$ | 20 | 20 | 20 | 20 | 20 | 20 |
| Diethylene Glycol | 2 | 2 | 2 | 2 | 2 | 2 |
| Stearic Acid | 1 | 1 | 1 | 1 | 1 | 1 |
| ZnO | 5 | 5 | 5 | 5 | 5 | 5 |
| Accelerator DM | 1.5 | 1.5 | 1.5 | 1.5 | 1.5 | 1.5 |
| Accelerator D | 0.5 | 0.5 | 0.5 | 0.5 | 0.5 | 0.5 |
| Process Oil | 10 | 10 | 10 | 10 | 10 | 10 |
| Sulfur | Added so as to be 2.5 PHR | | | | | |

The above Compositions H were vulcanized at 153° C. for 10 minutes. The properties after co-vulcanization at each blending ratio were examined. The results obtained are shown in Table 4 and FIG. 6. In FIG. 6, X designates the blank, Δ designates treatment at 150° C. for 45 minutes and O designates treatment at 150° C. for 120 minutes.

TABLE 4

| EPDM/NR Properties | | 10/0 | 8/2 | 7/3 | 6/4 | 5/5 | 3/7 | 0/10 |
|---|---|---|---|---|---|---|---|---|
| Blank | M300 | 23 | 21 | 23 | 27.5 | Not examined | | 50 |
| | TB | 150 | 43 | 31 | 44 | | | 220 |
| | EB | 750 | 700 | 550 | 575 | | | 650 |
| Treated at 150° C. for 45 minutes | M300 | | 25 | 28 | 29.5 | 32 | 35 | |
| | TB | Not examined | 115 | 101 | 79 | 101 | 127 | |
| | EB | | 850 | 775 | 750 | 675 | 650 | |
| Treated at 150° C. for 120 minutes | M300 | | 35 | 27 | 30 | 30 | 36 | |
| | TB | Not examined | 132 | 130 | 134 | 172 | 172 | |
| | EB | | 675 | 775 | 725 | 700 | 700 | |

Note:
M300 300% modulus (kg/cm²)
TB Tensile strength (kg/cm²)
EB Elongation at break (%)

EXAMPLE 7

| Composition I: | |
|---|---|
| EPDM (third component: ethylidene norbornene, iodine number: 26) | 100 |
| S | 1.5 |
| Sulfur Cleaving Agent CLP-I (tri-chloroethylphosphite) | 1 |

The above described composition was mixed in the same manner as in Example 5 and pressed using a heating press at 160° C. for 45 minutes.

Then, the following composition was prepared.

Composition J:

| | |
|---|---|
| Composition I | 70 |
| NR | 30 |
| HAF Carbon | 30 |
| CaCO$_3$ | 20 |
| ZnO | 5 |
| Stearic Acid | 1 |
| Process Oil | 10 |
| DM (2-mercaptobenzothiazyl disulfide) | 1.5 |
| D (diphenylguanidine) | 0.5 |
| Sulfur | 1.0 |

The resulting composition was mixed in the same manner as in Example 5. The properties obtained of the resulting co-vulcanized product are shown in Table 5.

TABLE 5

| | Treated at 135° C. for 15′ | Not Treated |
|---|---|---|
| M300 (kg/cm$^2$) | 26 | 23 |
| TB (kg/cm$^2$) | 105 | 31 |
| EB (%) | 750 | 550 |

Note: M300, TB and EB each has the same meaning as described in Example 6.

EXAMPLE 8

Composition K:

| | |
|---|---|
| IIR (isoprene content: 1.5% by mol) | 100 |
| Hexamethylenetetramine as the Sulfur Cleaving Agent | 0.4 |
| Sulfur | 1.5 |
| Condition of Treatment: pressing at 150° C. for 60 minutes | |

Composition L:

| | |
|---|---|
| NR 4 | 50 |
| Composition K | 50 |
| ZnO | 5 |
| Stearic Acid | 1 |
| FEF Carbon | 50 |
| Accelerator DM (2-mercaptobenzo-thiazyl-disulfide) | 1.0 |
| Accelerator TT (tetramethylthiuram disulfide) | 0.3 |
| Sulfur | 2.0 |

The properties obtained of the co-vulcanized product of Composition L are shown in Table 6 wherein the product which is not treated is shown for comparison.

TABLE 6

| | Treated at 153° C. for 10 Minutes | Not Treated |
|---|---|---|
| M300 (kg/cm$^2$) | 80 | Measurement is impossible |
| TB (kg/cm$^2$) | 110 | 69 |
| EB (%) | 400 | 250 |

It can be understood from Example 8 that the present invention is effective in the case of a blend of IIR and NR.

EXAMPLE 9

Composition M:

| | |
|---|---|
| EPDM (third component: ethylidene norbornene, iodine number: 26) | 100 |
| Sulfur | 2.38 |

-continued

Composition M:

| | |
|---|---|
| Hexamethylenetetramine | 0.4 |

The above composition was mixed using rolls having a surface temperature of 40° to 50° C. at room temperature for 30 minutes to produce a sheet. This sheet was left in an oven at 150° C. for 10 to 150 minutes to carry out the heat treatment.

Then, the following Composition N was prepared and mixed to produce a sample having a size of 150 mm × 200 mm × 2 mm. This sample was vulcanized at 153° C. for 10 minutes and it was examined according to JIS K-6301. The results obtained are shown in Table 7 and FIG. 7.

Composition N:

| | |
|---|---|
| Composition M | 35 |
| SBR 1502 | 35 |
| NR 4 | 30 |
| ZnO | 5 |
| Stearic Acid | 1 |
| HAF Carbon | 30 |
| CaCO$_3$ | 20 |
| Accelerator DM (2-mercaptobenzo-thiazyl disulfide) | 1.5 |
| Accelerator D (diphenylguanidine) | 0.5 |
| S | Added so as to be 2.5 PHR |
| Process Oil | 10 |

TABLE 7

| Treating Time (minute) | 300% Modulus (kg/cm$^2$) | Tensile Strength kg/cm$^2$ | Elongation (%) |
|---|---|---|---|
| No treatment | 31 | 95 | 625 |
| 45′(¾hr) | 28 | 115 | 625 |
| 60′(1 hr) | 27 | 126 | 675 |
| 90′(1.5hr) | 31 | 158 | 650 |
| 120′(2 hr) | 26 | 172 | 725 |
| 150′(2.5hr) | 29 | 174 | 650 |

Note: The treating time is the period of time for treating in an oven at 150° C.

As is clear from the results in the above table and FIG. 7, the objects of the present invention can be sufficiently attained when the combined sulfur is 1 phr or so based on the EPDM.

EXAMPLE 10

To determine the properties of the vulcanized products according to the present invention, evaluations were carried out.

Composition O:

| | |
|---|---|
| EPDM (third component: ethylidene norbornene, iodine number: 26) | 100 |
| Accelerator DM (dibenzothiazyl disulfide) | 0.8 |
| Accelerator DPG (diphenylguanidine) | 0.2 |
| S | 1.0 |

Using the above described Composition O, the following Composition P was prepared and treated at 160° C. for 0 minute, 1 1 minute, 2 minutes or 3 minutes in a Bumbury mixer to produce Samples (1) to (4).

| Composition P: | Sample No. | | | |
|---|---|---|---|---|
| | (1) | (2) | (3) | (4) |
| treating time of Composition O (minute) | 0 | 1 | 2 | 3 |
| Composition O | 30 | 30 | 30 | 30 |
| SBR | 40 | 1 | 2 | 3 |
| NR | 30 | 30 | 30 | 30 |
| ZnO | 5 | 5 | 5 | 5 |
| Stearic Acid | 1 | 1 | 1 | 1 |
| White Carbon | 30 | 30 | 30 | 30 |
| Process Oil | 10 | 10 | 10 | 10 |
| Accelerator DM | 1.3 | 1.3 | 1.3 | 1.3 |
| Accelerator D | 0.5 | 0.5 | 0.5 | 0.5 |
| S | Added so as to be 2.5 PHR | | | |
| Diethyleneglycol | 2.0 | 1 | 2 | 3 |

The above described Samples (1) to (4) were then mixed using rolls having a surface temperature of 40° to 50° C. at room temperature for 30 minutes and vulcanized at 153° C. for 10 minutes in a mold having a size of 150 mm×200 mm×2 mm.

The each resulting vulcanized product was examined according to JIS K-6301. The results obtained are shown in Table 8.

TABLE 8

| | Sample No. | | | |
|---|---|---|---|---|
| | (1) | (2) | (3) | (4) |
| 300% Modulus (kg/cm$^2$) | 35 | 39 | 45 | 48 |
| Tensile Strength (kg/cm$^2$) | 94 | 112 | 140 | 155 |
| Elongation (%) | 575 | 575 | 600 | 600 |

It can be understood from the results in the above Table 8 that the vulcanized rubber which is produced by blending EPDM, SBR and NR without treating in a Bumbury mixer at 160° C. (Sample 1) has poor properties and can not be practically used as tires, belts and for other dynamic uses, while the heat treated vulcanized rubbers (Samples 2, 3 and 4) exhibit a remarkable improvement in properties as the treating time of the EPDM at 160° C. is increased and can be practically used.

EXAMPLE 11

In order to compare the effect of the known co-vulcanization method and that of the present invention, the following Composition Q was treated in a Bumbury mixer in the same manner as in Example 10. Then the following Composition R was prepared using the above described composition. The composition was mixed and vulcanized at 153° C. for 10 minutes. The properties of the vulcanized products were then examined. The results obtained are shown in Table 9.

| Composition Q: | |
|---|---|
| EPDM (third component: ethylidene norbornene, iodine number: 26) | 100 |
| ZnO | 5 |
| Stearic Acid | 1 |
| Accelerator DM | 0.8 |
| Accelerator D | 0.2 |
| S | 1.0 |

| Composition R: | Sample No. | | |
|---|---|---|---|
| | (1) | (2) | (3) |
| Treating Time of Composition Q in a Bumbury Mixer (minute) | 1 | 2 | 3 |
| Composition Q | 30 | 30 | 30 |
| SBR | 40 | 40 | 40 |
| NR | 30 | 30 | 30 |
| ZnO | 3.5 | 3.5 | 3.5 |
| Stearic Acid | 0.7 | 0.7 | 0.7 |
| White Carbon | 30 | 30 | 30 |
| Process Oil | 10 | 10 | 10 |
| Accelerator DM | 1.3 | 1.3 | 1.3 |
| Accelerator D | 0.5 | 0.5 | 0.5 |
| S | Added so as to be 2.5 PHR | | |
| Diethyleneglycol | 2.0 | 2.0 | 2.0 |

TABLE 9

| | Sample No. | | | |
|---|---|---|---|---|
| | (1) | (2) | (3) | (4) |
| Treating Time in Bumbury Mixer (minute) | 1 | 2 | 3 | 3 |
| 300% Modulus (kg/cm$^2$) | 88 | 40 | 52 | 48 |
| Tensile Strength (kg/cm$^2$) | 105 | 118 | 93 | 155 |
| Elongation (%) | 550 | 500 | 400 | 600 |

*this invention

As the result of the above evaluations, it can be understood that the properties of matter according to the present invention are further superior to those of the known method, while the vulcanized products obtained by the known method have a poor processing property because of complete vulcanization and the properties of matter thereof deteriorate because they contain impurities. Further, it is difficult in the known method to remove the product in a desired semi-vulcanized state.

EXAMPLE 12

In order to compare the products which were treated in a Bumbury mixer and the product which was not treated, the following examinations were carried out.

| Composition S | |
|---|---|
| EPDM (third component: ethylidene norbornene, iodine number: 26) | 100 |
| Triethylenetetramine | 1.0 |
| S | 1.0 |

Two blends were produced using the above described Composition S, wherein one was treated in a Bumbury mixer at 160° C. for 5 minutes and the other was not treated. Then, the samples shown in Table 10 were prepared with varying the blending ratio of EPDM to NR.

TABLE 10

| | Sample No. | | | | | |
|---|---|---|---|---|---|---|
| | (1) | (2) | (3) | (4) | (5) | (6) |
| Composition S | 100 | 80 | 60 | 40 | 20 | — |
| NR | — | 20 | 40 | 60 | 80 | 100 |
| ZnO | 5 | 5 | 5 | 5 | 5 | 5 |
| Stearic Acid | 1 | 1 | 1 | 1 | 1 | 1 |
| HAF Carbon Black | 40 | 40 | 40 | 40 | 40 | 40 |
| Process Oil | 10 | 10 | 10 | 10 | 10 | 10 |
| Accelerator CZ | 1.5 | 1.5 | 1.5 | 1.5 | 1.5 | 1.5 |
| S | Added so as to be 2.5 PHR | | | | | |

Mixing and vulcanization of each composition described in the above Table 10 were carried out under the same conditions as in Example 10. The evaluations were carried out in the same manner as in Example 10. The results obtained are shown in Table 11 and FIG. 8.

TABLE 11

|  |  | Sample No. | | | | | |
| --- | --- | --- | --- | --- | --- | --- | --- |
|  |  | (1) | (2) | (3) | (4) | (5) | (6) |
| No Treatment | 300% Modulus (kg/cm$^2$) | 98 | 115 | 122 | 137 | 143 | 165 |
|  | Tensile Strength (kg/cm$^2$) | 262 | 201 | 190 | 192 | 211 | 208 |
|  | Elongation (%) | 575 | 450 | 475 | 450 | 450 | 475 |
| Treated | 300% Modulus (kg/cm$^2$) | Not measured | 118 | 126 | 140 | 149 | Not measured |
|  | tensile Strength (kg/cm$^2$) |  | 252 | 256 | 266 | 277 |  |
|  | Elongation (%) |  | 525 | 500 | 500 | 475 |  |

As is shown in Table 11, the properties of the co-vulcanized rubbers can be remarkably improved by treating the low unsaturated rubber at a high temperature. In FIG. 8, curve c designates no treatment and curve d designates treatment. These curves show that the tensile strength of the treated samples is not adversely affected by the blending ratio of the low unsaturated rubber (EPDM) and the high unsaturated rubber (NR), which means good co-vulcanization.

EXAMPLE 13

The following composition which was different from that of the above described Example 12 was used for evaluation, wherein a part of the composition was treated in a Bumbury mixer and the other was not treated.

| Composition T: | |
| --- | --- |
| EPDM (third component: dicyclopentadiene, iodine number: 10) | 100 |
| Accelerator EZ (zinc salt of diethyldithiocarbamate) | 0.8 |
| S | 1.0 |

| Composition U: | |
| --- | --- |
| Composition T | 50 |
| NR | 50 |
| ZnO | 5 |
| Stearic Acid | 1 |
| HAF Carbon Black | 40 |
| Process Oil | 10 |
| Accelerator TMTD | 1.0 |
| S | 1.0 |

Using the above described Composition T, the sample which was not treated (Sample 1) and the sample which was treated in a Bumbury mixer at 160° C. for 5 minutes (Sample 2) were produced. Composition U was prepared using these samples and vulcanized samples were produced therefrom. These samples were evaluated. The results obtained are shown in Table 12.

TABLE 12

|  | Sample No. | |
| --- | --- | --- |
|  | (1) | (2) |
| Treating Time (minute) | 0 | 5 |
| 100% Modulus (kg/cm$^2$) | 26 | 37 |

TABLE 12-continued

|  | Sample No. | |
| --- | --- | --- |
|  | (1) | (2) |
| Tensile Strength (kg/cm$^2$) | 68 | 125 |
| Elongation (%) | 250 | 375 |

It can be understood from the above Table 12 that blending with natural rubber (NR) can be effectively carried out according to the present invention even if the third component of EPDM is dicyclopentadiene.

EXAMPLE 14

Evaluations for the purposes of comparison were carried out as follows using another low unsaturated rubber.

| Composition V: | |
| --- | --- |
| IIR (isoprene content: 1.6%) | 100 |
| Accelerator EZ | 0.8 |
| S | 1.0 |

Two samples were produced from the above Composition U, one of which was not treated (Sample 1) and the other was treated in a Bumbury mixer at 160° C. for 5 minutes (Sample 2). Vulcanized samples were produced in the same manner as in Example 13 using Composition U of Example 13 but Composition V was used instead of Composition T. These samples were evaluated in the same manner as described above. The results are shown in Table 13.

TABLE 13

|  | Sample No. | |
| --- | --- | --- |
|  | (1) | (2) |
| Treating Time (minute) | 0 | 5 |
| 100% Modulus (kg/cm$^2$) | 28 | 45 |
| Tensile Strength (kg/cm$^2$) | 76 | 142 |
| Elongation (%) | 250 | 450 |

EXAMPLE 15

A terpolymer of ethylene, propylene and ethylidene norbornene (Polymer 1) (iodine number: 26) was dissolved in 800 ml of carbon tetrachloride. 2 g of Br$_2$ was added dropwise thereto at room temperature with stirring. After bromination, 10 g of the Ag salt of 2-mercaptobenzothiazole was added thereto to react at 60° to 80° C. The excess of the Ag salt of 2-mercaptobenzothiazole was then removed by repeatedly carrying out reprecipitation using acetone-methanol. After drying in a vacuum, a polymer (Polymer 2) was produced. As the result of quantitative analysis using infrared absorption spectra, it was recognized that 1 phr of 2-mercaptobenzothiazole combined to the Polymer 1.

This sample was evaluated using the following Compositions W and X to determine whether this polymer could be vulcanized without using sulfur cleaving agents.

|  | W | X |
|---|---|---|
| Polymer 1 (EPDM) | 100 | — |
| Polymer 2 (EPDM combined with sulfur cleaving agent) | — | 100 |
| ZnO | 5 | 5 |
| Stearic Acid | 1 | 1 |
| 2-Mercaptobenzothiazole | 1 | — |
| Sulfur | 2 | 2 |

Rheometer curves of the above described rubbers are shown in FIG. 9. As can be understood from this figure, no problem from the standpoint of vulcanization of the rubber according to this invention occurred. This rubber is practically useful because vulcanization occurs rather rapidly.

These samples were vulcanized at 150° C. for 40 minutes and examined according to JIS K-6301. The results obtained are shown in Table 14.

TABLE 14

|  | W | X |
|---|---|---|
| 300% Modulus (kg/cm$^2$) | 11.2 | 13 |
| Tensile Strength (kg/cm$^2$) | 18.1 | 45.2 |
| Elongation (%) | 500 | 600 |

As is clear from the results in the above table, the vulcanized product (Composition X) of the present invention has a high tensile strength and large elongation while the 300% modulus nearly equals that of the Composition W, and that homogeneous vulcanization can be carried out as compared with the prior vulcanized product.

EXAMPLE 16

This example shows that a bend of a low unsaturated rubber and a high unsaturated rubber of the present invention can be homogeneously vulcanized. The blends used in this example are composed of EPDM (Polymer 1 and Polymer 2) and natural rubber (Polymer 3).

|  | Y | Z |
|---|---|---|
| Polymer 1 (EPDM) | 50 | — |
| Polymer 2 (EPDM combined with sulfur cleaving agent) | — | 50 |
| Polymer 3 (NR) | 50 | 50 |
| Zinc Oxide | 5 | 5 |
| Stearic Acid | 1 | 1 |
| 2-Mercaptobenzothiazole | 1 | 1.5 |
| Sulfur | 2.0 | 2.0 |

The above described blend rubbers were vulcanized at 150° C. for 40 minutes, and evaluated according to JIS K-6301. The results obtained are shown in Table 15.

TABLE 15

|  | Y | Z |
|---|---|---|
| 300% Modulus (kg/cm$^2$) | 13.8 | 13.1 |
| Tensile Strength (kg/cm$^2$) | 67.7 | 129 |

TABLE 15-continued

|  | Y | Z |
|---|---|---|
| Elongation (%) | 675 | 800 |

This table shows that the sample which contained the combined sulfur cleaving agent (Composition Z) has a higher tensile strength and elongation than Composition Y while the modulus thereof is equal to that of the Composition Y, because the vulcanization can be homogeneously carried out.

EXAMPLE 17

Polymer 3 (100 g) was dissolved in benzene (800 ml). Then 4-thionylaniline-2-mercaptobenzothiazole (2 g) was added thereto and the mixture was reacted at 80° C. for about 4 hours with stirring. After reacting, reprecipitation of the product was repeated with using acetone and methanol. The product was then dried. As a result of evaluation using infra-red absorption spectra, it could be understood that the product contained 1.2 phr of combined 2-mercaptobenzothiazole (Polymer 4). In order to demonstrate the difference between Polymer 3 and Polymer 4, the properties of the following compositions were evaluated. The results obtained are shown in Table 16.

|  | α | β |
|---|---|---|
| Polymer 3 (NR) | 100 | — |
| Polymer 4 (NR combined with sulfur cleaving agent) | — | 100 |
| Zinc Oxide | 5 | 5 |
| Stearic Acid | 1 | 1 |
| 2-Mercaptobenzothiazole | 1.2 | — |
| Sulfur | 2.5 | 2.5 |
| Carbon | 50 | 50 |

The properties of the vulcanized products which were treated at 150° C. for 20 minutes are shown in the following table.

TABLE 16

|  |  | α | β |
|---|---|---|---|
|  | Hardness (JIS) | 62 | 62 |
| Stretching test | 300% Modulus (kg/cm$^2$) | 143 | 138 |
|  | Tensile Strength (kg/cm$^2$) | 193 | 235 |
|  | Elongation (%) | 400 | 475 |
|  | Tearing Strength A Type (kg/cm) | 36 | 42 |
|  | Dematta Flex Cracking Test (cycle) | 30,000 | 37,400 |
|  | William Abrasion Amount (cc) | 0.087 | 0.062 |
| Ageing test (ratio of conversion %) (at 70° C. for 7 days) | Hardness | +2 | +2 |
|  | 300% Modulus | +18 | +12 |
|  | Tensile Strength | +8 | +2 |
|  | Elongation | +10 | −2 |

As is clear from the results obtained in above described examples, the vulcanizable rubbers which can be blended with any kind of high unsaturated rubber in the desired ratio and can be completely co-vulcanized are obtained by combining sulfur or the sulfur cleaving agent with unsaturated rubbers in the absence of metal oxides such as ZnO, CdO, MgO, PbO and NiO and aliphatic acid salts as vulcanization activators to form polysulfide pendant bonds in the unsaturated rubbers by fragments of the sulfur cleaving agent, and consequently co-vulcanized rubbers having excellent properties can be produced.

The fact that the blend products according to the present invention are completely co-polymerized is clear from the fact that the properties of the vulcanized rubbers are remarkably improved at any blending ratio, as shown in Examples 4 and 5, notwithstanding that co-vulcanization of EPDM and natural rubber has been previously considered to be impossible to carry out.

While the invention has been described in detail and with reference to specific embodiments thereof, it will be apparent to one skilled in the art that various changes and modifications can be made therein without departing from the spirit and scope thereof.

What is claimed is:

1. A process for producing a covulcanized rubber which comprises the steps of:
   (a) simultaneously incorporating sulfur and a sulfur cleaving agent selected from the group consisting of tertiary amines, secondary amines, primary amines, aliphatic polyamines, cyclic amines, thiazole-type accelerators, guanidine-type accelerators, thiourea-type accelerators, thiuram-type accelerators, dithiocarbamic acid-type accelerators, metal salts of said dithiocarbamic acid, xanthogenates, phosphines, phosphites and nucleophilic reagents containing a cyano group, in an ethylenepropylene terpolymer or butyl rubber at a temperature of less than 60° C.;
   (b) heating the resulting blend in the absence of a metal oxide at a temperature in excess of 60° C. to produce a substantially uncrosslinked pendant rubber, the amount of said sulfur cleaving agent and said time of heating the blend being sufficient to produce said pendant rubber but insufficient to cause any substantial crosslinking thereof;
   (c) blending the resulting substantially uncrosslinked pendant rubber with at least one high unsaturated rubber, and
   (d) heating the blend of step (c) in the presence of a metal oxide selected from the group consisting of ZnO, CdO, MgO, PbO, CaO and NiO to produce said convulcanized rubber.

2. The process of claim 1, wherein the time of heating the blend in step (b) is 20 to 150 min.

3. The process of claim 1, wherein the amount of said sulfur cleaving agent is 0.3 to 1.5% by weight based on the weight of the ethylene-propylene terpolymer or butyl rubber.

4. The method of claim 1, wherein the high unsaturated rubber is chosen from the group consisting of natural rubber, polyisoprene rubber, polybutadiene rubber, styrene-butadiene copolymer, nitrile rubber and polychloroprene rubber.

5. The process of claim 1, wherein said pendant rubber is prepared by addition reacting a low unsaturated rubber with a compound which is produced by combining said sulfur cleaving agent and a compound having a functional group selected from the group consisting of a nitrile oxide, a nitroso and a thionylamine group.

6. A co-vulcanized rubber obtained by the process claimed in claim 1.

* * * * *